United States Patent
Rodyushkin et al.

(10) Patent No.: US 11,928,860 B2
(45) Date of Patent: Mar. 12, 2024

(54) ON THE FLY ADAPTIVE CONVOLUTIONAL NEURAL NETWORK FOR VARIABLE COMPUTATIONAL BUDGET

(71) Applicant: Intel Corporation, Santa Clara, CA (US)

(72) Inventors: Konstantin Vladimirovich Rodyushkin, Nishny Novgorod (RU); Alexander Vladimirovich Bovyrin, Nishny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 588 days.

(21) Appl. No.: 17/058,077

(22) PCT Filed: Dec. 14, 2018

(86) PCT No.: PCT/RU2018/000828
§ 371 (c)(1),
(2) Date: Nov. 23, 2020

(87) PCT Pub. No.: WO2020/122753
PCT Pub. Date: Jun. 18, 2020

(65) Prior Publication Data
US 2021/0216747 A1    Jul. 15, 2021

(51) Int. Cl.
*G06V 10/96*    (2022.01)
*G06F 18/211*    (2023.01)
*G06N 3/08*    (2023.01)
*G06V 10/44*    (2022.01)
*G06V 20/64*    (2022.01)

(52) U.S. Cl.
CPC .......... *G06V 10/96* (2022.01); *G06F 18/211* (2023.01); *G06N 3/08* (2013.01); *G06V 10/454* (2022.01); *G06V 20/64* (2022.01)

(58) Field of Classification Search
CPC ...... G06V 10/96; G06V 10/454; G06V 20/64; G06F 18/211; G06N 3/08
USPC ....................................................... 382/181
See application file for complete search history.

(56) References Cited

U.S. PATENT DOCUMENTS

| | | | |
|---|---|---|---|
| 10,051,423 B1 * | 8/2018 | Feinmesser | H04L 47/283 |
| 10,185,891 B1 * | 1/2019 | Martin | G06N 3/084 |
| 10,997,502 B1 * | 5/2021 | Casas | G06N 3/063 |
| 2016/0162782 A1 * | 6/2016 | Park | G06N 3/082 |
| | | | 706/17 |

(Continued)

FOREIGN PATENT DOCUMENTS

| | | | | |
|---|---|---|---|---|
| WO | 2018084974 | | 5/2018 | |
| WO | WO2018084974 | * | 5/2018 | ............... G06N 3/04 |

OTHER PUBLICATIONS

International Search Report and Written Opinion for PCT Application No. PCT/RU2018/000828, dated Sep. 4, 2019.

(Continued)

*Primary Examiner* — Jerome Grant, II
(74) *Attorney, Agent, or Firm* — Essential Patents Group, LLP

(57) ABSTRACT

Techniques related to object detection using an adaptive convolutional neural network (CNN) are discussed. Such techniques include applying one of multiple configurations of the CNN to input image data in response to an available computational resources for processing the input image data.

23 Claims, 8 Drawing Sheets

(56) References Cited

U.S. PATENT DOCUMENTS

2018/0336431 A1   11/2018   Kadav et al.
2020/0279156 A1*   9/2020   Cai .................... G06V 10/764

OTHER PUBLICATIONS

Hu, H. et al., "Network trimming: A data-driven neuron pruning approach towards efficient deep architectures", arXiv preprint arXiv:1607.03250, 2016.

Kuen, J. et al., "Stochastic Downsampling for Cost-Adjustable Inference and Improved Regularization in Convolutional Networks", CVPR, 2018.

Li, H. et al., "Pruning filters for efficient convnets", arXiv prepring arXiv:1608.08710, 2016.

Lin, et al., "Runtime Neural Pruning", $31^{st}$ Conference on Neural Information Processing Systems (NIPS 2017), Long Beach CA, USA.

Molchanov, S. et al., "Pruning convolutional neural networks for resource efficient transfer learning", arXiv prepring arXiv:1611.06440, 2016.

Polyak, A. et al., "Channel-level accelaration of deep face representations", IEEE Access, vol. 3, pp. 2163-2175, 2015.

Srinivas, S. et al., "Data-free parameter pruning for deep neural networks", arXiv prepring arXiv:1507.06149, 2015.

Office Action from European Patent Application No. 18842859.3 dated Jun. 5, 2023, 6 pgs.

* cited by examiner

700

Apply, in response to a First Computational Resource Level for a First Input Image, a First Subset of available Convolutional Filters at a Convolutional Layer of a CNN — 701

Apply, in response to a Change to a Second Computational Resource Level for a Second Input Image, the First Subset and One or More Additional of the available Convolutional Filters at the Convolutional Layer of the CNNv — 702

Transmit First and Second Object Recognition Indicators for the First and Second Images — 703

FIG.7

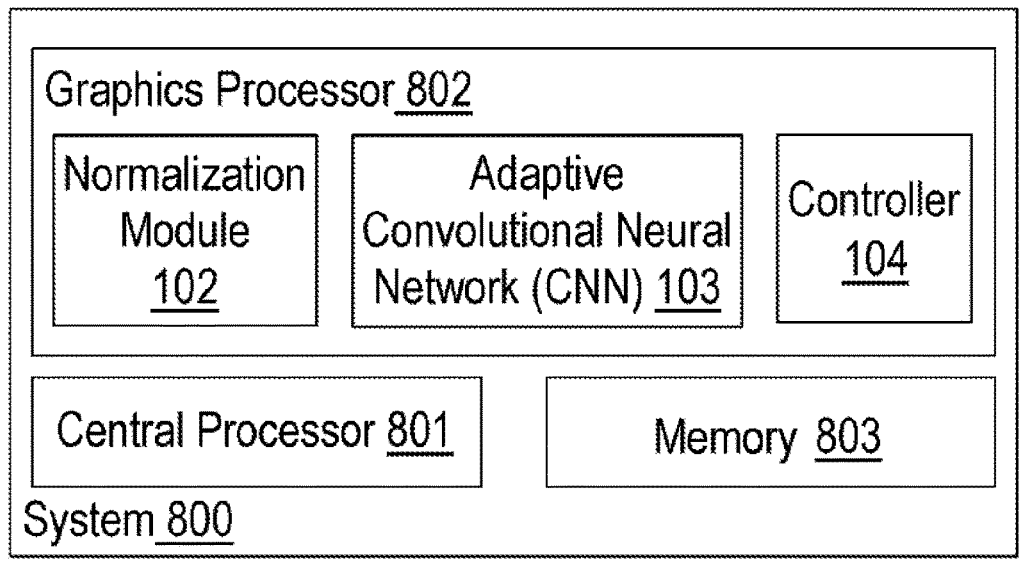

FIG.8

ON THE FLY ADAPTIVE CONVOLUTIONAL NEURAL NETWORK FOR VARIABLE COMPUTATIONAL BUDGET

CLAIM OF PRIORITY

This Application is a National Stage Entry of, and claims priority to, PCT Application No. PCT/RU2018/000828, filed on 14 Dec. 2018 and titled "ON THE FLY ADAPTIVE CONVOLUTIONAL NEURAL NETWORK FOR VARIABLE COMPUTATIONAL BUDGET", which is incorporated by reference in its entirety for all purposes.

BACKGROUND

In the context of analyzing images or video images of a sequence of video images or frames, convolutional neural networks (CNNs) may be used for object recognition, face recognition, etc. CNNs provide high quality results at the cost of large model size and large computing costs, which may make implementation in resource-limited environments difficult. In particular, in some implementations, the computational budget for CNN inference is dependent on the changing real-time computational resource availability of the device or system implementing the CNN. For example, in the case of a central processing unit (CPU) implementing a CNN, the available resources of the CPU for the CNN computational load can vary dramatically depending on other applications running on the CPU (e.g., an antivirus application runs suddenly, etc.).

Typically, in the case of computational resource limitations, computer vision systems skip frames and important information can be missed. This is critical, for instance, in autonomous driving applications when objects may occur in the view of a camera in just one or two frames and skipping frames may miss important object recognition information.

Therefore, current techniques for implementing CNNs in variable computational resource environments have limitations. It is with respect to these and other considerations that the present improvements have been needed. Such improvements may become critical as the desire to object recognition in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 7 is a flow diagram illustrating an example process for performing object recognition using a convolutional neural network that is adaptive based on available computational resources;

FIG. 8 is an illustrative diagram of an example system for performing object recognition using a convolutional neural network that is adaptive based on available computational resources;

DETAILED DESCRIPTION

Figure 1:
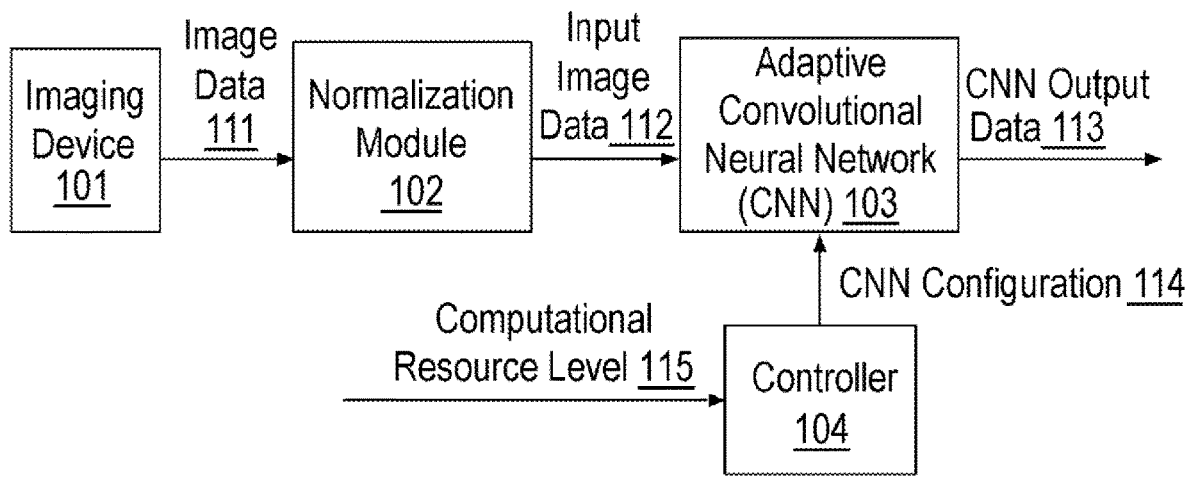
FIG. 1 illustrates an example system for performing object recognition using a CNN adaptive to available computational resources.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein. The terms "substantially," "close," "approximately," "near," and "about," generally refer to being within +/−10% of a target value. The term "satisfies" when used in reference to a threshold indicates the value in question meets the condition established by the threshold. The terms "compares favorably" when used in reference to a threshold indicates the value in question is greater than or greater than or equal to the threshold. Similarly, the terms "compares unfavorably" when used in reference to a threshold indicates the value in question is less than or less than or equal to the threshold.

Methods, devices, apparatuses, computing platforms, and articles are described herein related to the implementation of CNNs in variable computational resource environments and, in particular, to adjusting the number of convolutional filters applied at convolutional layers of the CNN in response to varying computational resources available for the CNN.

As described above, CNNs may be implemented to provide high quality object recognition results. In some embodiments, an adaptive CNN architecture is provided such that on the fly response to computational resources is provided. The adaptive CNN may be trained such that the CNN may be employed in any number of configurations. In each configuration, a number of convolutional filters at each convolutional layer (and a number of fully connected channels in a fully connected layer) of the CNN varies. Furthermore, in each configuration, the employed convolutional filters share the same filter coefficients and, therefore, filter structure. During inference, when a sufficient computational resource level is available, the full CNN (e.g., a configuration using all available convolutional filters at each convolutional layer) is used. When, as lower computational resource levels are available, fewer and fewer of the available convolutional filters at each convolutional layer are used. As used herein, the term computational resource level indicates one or more of available computational cycles, available processor cores in multi-core systems, available memory resources, available power resources, etc. Such computational resource levels to CNN configurations may be predefined such that a CNN configuration may be accessed via a look up table based on such computational resource level parameters as inputs or using any suitable technique or techniques.

The described CNN is trained such that each configuration of the CNN shares filter parameters for all filters. For example, a first subset of available convolutional filters may be applied at a convolutional layer when the CNN is in a lowest computational resource configuration. At a higher computational resource configuration, the first subset and one or more additional convolutional filters are applied at the convolutional layer. At both the lowest computational resource configuration and all higher computational resource configurations, the same convolutional filters of the first subset are applied. Similar, at the highest computational resource configuration, all convolutional filters of the highest computational resource configuration that are also in the lower computational resource configurations are applied with the same (e.g., shared or common) convolutional filter coefficients across all computational resource configurations of the CNN.

The discussed techniques provide for training and use (e.g., inference) of an adaptive CNN that is configured based on available computational resources or budget in an on the fly manner during inference. For example, available computational resources may be monitored and a suitable CNN configuration may be selected prior to processing each image or frame of a video sequence. The discussed techniques work robustly as computational resources or power varies due to, for example, float and not-stable computational resources availability due to, for example, unstable power, redistribution of CPU or graphics processing unit (GPU) load in the case of occasionally running side programs or services (e.g., antivirus software) and so on.

The adaptive CNN configurations discussed herein vary usage of sets of convolutional filters having shared or common convolutional filter coefficients at one or more convolutional layers of the CNN. When higher computational resources are available, more convolutional filters (e.g., the sets have more convolutional filters) are used and, when lower convolutional filters, fewer convolutional filters are used. Since the same convolutional filter coefficients are in the common convolutional filters are used regardless of configuration (e.g., although not all convolutional filters are applied in each configuration, the convolutional filter coefficients are the same), the feature maps generated by the convolutional filters are of the same resolution. The number of generated feature maps changes at the convolutional layer depending on the number of convolutional filters in the set applied in the particular configuration; however, the resolution of the feature maps are the same. As used herein, the term resolution with respect to images or feature maps indicates the number of members or data points therein. In the context of images, resolution indicates the number of pixels. In the context of feature maps, resolution indicates the number of data points in the feature map. Notably, in the techniques discussed herein, the resolution or size of the feature maps is not varied in response to computational resource changes. Furthermore, the convolutional filter coefficients are shared, as discussed. Therefore, convolutional filter coefficients (nor the CNN architecture itself) do not need to be reloaded to memory on the fly, offering enhanced efficiency and speed of operation of the CNN in real time.

As discussed further herein, a single CNN is trained such that even a piece (e.g., a configuration using only subsets of available convolutional filters at each convolutional layer) of the CNN, during inference, produces reliable and useful object recognition or classification results. Smaller pieces (e.g., configurations with fewer convolutional filters in use) of the CNN are used in very limited computational resource environments to perform defined computer vision tasks and bigger pieces (e.g., configurations with more convolutional filters in use) or even the entirety of the CNN are used when more computational resources are available such that, as more computational resources are available, the CNN provides the highest available quality of object recognition or classification results. As used herein, the terms object recognition and classification are used interchangeably and are inclusive of object detection. Data structures or indicators of object recognition or classification may indicate probability scores of a particular class of object being detected, an indicator as to whether or not a particular class of object has been detected, or any other suitable data structure to indicate an object has been recognized, classified, or detected in an image.

FIG. 1 illustrates an example system 100 for performing object recognition using a CNN adaptive to available computational resources, arranged in accordance with at least some implementations of the present disclosure. As shown in FIG. 1, system 100 includes an imaging device 101, a normalization module 102, an adaptive convolutional neural network (CNN) module 103, and a controller 104. System 100 may be implemented in any suitable form factor device such as motor vehicle platform, a robotics platform, a personal computer, a laptop computer, a tablet, a phablet, a smart phone, a digital camera, a gaming console, a wearable device, a display device, an all-in-one device, a two-in-one device, etc. For example, system 100 may perform object recognition as discussed herein.

As shown, imaging device 101 attains image data 111. Imaging device 101 may be any suitable imaging device such as an RGB camera or the like. As shown, in some embodiments, system 100 attains image data 111 via imaging device 101. In other embodiments, system 100 receives image data 111 or input image data 112 from another device via a communications channel (not shown). In some embodiments, image data 111 is attained for processing from a memory (not shown) of system 100. Image data 111 may include any suitable picture, frame, or the like or any data structure representing a picture or frame at any suitable resolution. In an embodiment, image data 111 is RGB image data having R (red), G (green), and B (blue), values for pixels thereof. In an embodiment, image data 111 is RGB-D image data having R, G, B, D (depth) values for pixels thereof. In an embodiment, image data 111 is single channel image data (e.g., luminance, IR, etc.) having a single value (e.g., an intensity value) at each pixel thereof.

Image data 111 may be received by optional normalization module 102. Normalization module 102, using image data 111, may optionally perform object detection using any suitable technique or techniques such as landmark detection to generate a bounding box around the object (if any). In addition or in the alternative, normalization module 102 may normalize image data corresponding to the detected objects (s) or may normalize the image data without using object detection to a predetermined size and/or scale to generate input image data 112. Input image data 112 may include any suitable data structure. In an embodiment, input image data 112 has a single channel (e.g., gray scale image data) such that input image data 112 has a single value for each pixel thereof. In an embodiment, input image data 112 has three color channels (e.g., RGB image data) such that input image data 112 has three values (e.g., an R value, a G value, and a B value) for each pixel thereof. Although discussed herein with respect to RGB image data, any suitable image data format (e.g., YUV, YCbCr, etc.) may be used. In an embodiment, input image data 112 has three color channels and a depth channel (e.g., RGB-D image data) such that input image data 112 has four values (e.g., an R value, a G value, a B value, and a D value) for each pixel thereof. Furthermore, input image data 112 may have any suitable size. In an embodiment, input image data 112 may represent any suitable size of image such as a 32×32 pixel image, a 160×160 pixel image, a 672×384 pixel image, etc. As discussed, normalization module 102 is optional. In an embodiment, normalization module 102 generates input image data 112 suitable for inference using adaptive CNN module 103. In another embodiment, image data 111 (as generated by system 100 or as received by system 100) is suitable for inference using adaptive CNN module 103.

As shown, input image data 112 and CNN configuration data 114 are received by adaptive CNN module 103, which applies a particular configuration of an adaptive CNN, as discussed further herein, to input image data 112 to generate CNN output data 113. CNN output data 113 may include any suitable data structure such as an N-dimensional vector with each value indicating a likelihood or score that an object or feature is within input image data 112. The N-dimensional vector may include any number of likelihood scores such as 10s, 100s, or even 1,000 scores or more. As shown, CNN output data 113 may be provided to another module of system 100 for the generation of object recognition data, for object tracking, for output to a user, for use in artificial intelligence applications, etc. In an embodiment, object recognition data that includes indication of a recognized object (e.g., a car, a bicycle, a person, etc.) is identified in input image data 112 based CNN output data 113.

As shown, controller 104 receives computational resource level 115. Computational resource level 115 may be any suitable data indicating computational resources that are available for the application of the adaptive CNN (e.g., via adaptive CNN module 103) to input image data 112. For example, computational resource level 115 may indicate one or more of a number of processing cores available, an available operation frequency, an available number of processor cycles per time, etc. that are available for the computational resource that is to apply the adaptive CNN. The computational resource may be any suitable computational resource such as a CPU, a GPU, an image signal processor, etc. In addition or in the alternative, computational resource level 115 may indicate one or more of an available memory allocation, an available memory bandwidth, etc. that are available for the memory resource that is to apply the adaptive CNN. The memory resource may be any suitable memory resource such as a static random access memory (SRAM), an on-board cache, etc. In some embodiments, computational resource level 115 is a predefined rating of available resources that may be a scalar value (e.g., 1 to 10), or one of a variety of descriptive values (e.g., low, medium-low, medium, medium-high, high) at any level of granularity.

Controller 104 translates computational resource level 115 to a CNN configuration 114. For example, the adaptive CNN may have one of N configurations such configuration 1 implements a lowest number of convolutional filters at one or more convolutional layers of the CNN (e.g., a lowest level of the adaptive CNN), configuration 2 implements a higher number of convolutional filters at one or more convolutional layers of the CNN (e.g., a higher level of the adaptive CNN), configuration 3 implements a yet higher number of convolutional filters at one or more convolutional layers of the CNN (e.g., a higher level of the adaptive CNN), and so on, through configuration N, which implements the full number of available convolutional filters at each convolutional layers of the CNN (e.g., a highest level of the adaptive CNN). The adaptive CNN may have any number of configurations, N, such as 2, 4, 8, or more.

Based on CNN configuration data 114, a particular configuration of the adaptive CNN is applied to input image data 112 via adaptive CNN module 103. Such techniques are discussed further herein with respect to FIG. 6. Notably, no matter the configuration of the adaptive CNN, of those convolutional filters that are applied at each convolutional layer of the adaptive CNN, the same convolutional filter coefficients are applied to input image data 112 and the feature maps corresponding to input image data 112.

Figure 2:
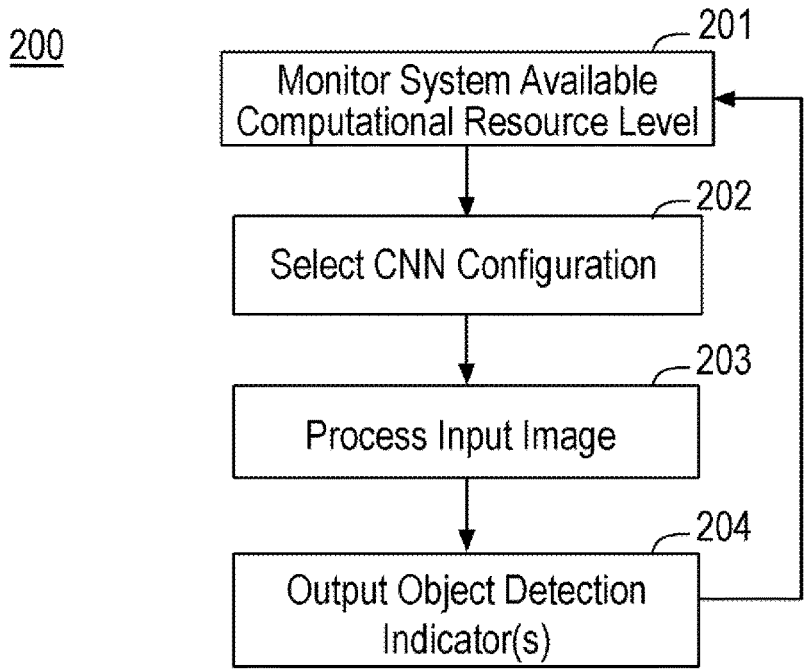
FIG. 2 is a flow diagram illustrating an example process for performing object recognition using a CNN adaptive to available computational resources.

FIG. 2 is a flow diagram illustrating an example process 200 for performing object recognition using a CNN adaptive to available computational resources, arranged in accordance with at least some implementations of the present disclosure. Process 200 may include one or more operations 201-204 as illustrated in FIG. 2. Process 200 may be performed by any device or system discussed herein to perform inference using an adaptive CNN as discussed herein. Process 200 or portions thereof may be repeated for any number of images, images of a video sequence, frames of a video sequence, etc. The object recognition indicators generated by process 200 may be used by other artificial intelligence applications, presented to a user (e.g., as a bounding box over an image corresponding to image data 111), stored to memory, etc.

Process 200 begins at operation 201, where an available computational resource level for implementing the adaptive CNN is monitored. Such monitoring may be performed continuously, at particular time intervals, as triggered by particular events (e.g., other software running, entry to a different power state, responsive to a user request), etc. Processing continues at operation 202, where a CNN configuration is selected based on the available computational resource monitoring. Such CNN configuration selection may be performed using any suitable technique or techniques. In an embodiment, the one or more available computational resource parameters are mapped to a particular CNN configuration using a look up table or similar mapping technique. Notably, the more the available computational resources, the higher the level of the configuration of the CNN (e.g., the more convolutional filters applied at one or more convolutional layers of the CNN) is selected and, thereby, the greater expected accuracy of the CNN corresponds to higher levels of available computational resources. Processing continues at operation 203, where the input image (e.g., input image data 112) is processed by the adaptive CNN using the selected CNN configuration. Such processing may be performed as discussed further herein with respect to FIG. 6. Processing continues at operation 204, where the object detection indicators, if any, corresponding to the application of the adaptive CNN are output.

As shown, processing continues at operation 201, where the available computational resource level for implementing the adaptive CNN are again monitored. If there is no change, the selected CNN configuration is used to process input images until a change is detected. If a change is detected, operations 202, 203, 204 are repeated to select a different CNN configuration for processing the next available input image data, implemented the newly selected CNN configuration, and output object detection indicators, if any. Notably, when computational resource levels are lower, at one or more convolutional layers of the adaptive CNN, fewer convolutional filters are applied to the input image data and/or feature maps corresponding to the input image data. When computational resource levels are higher, at the one or more convolutional layers of the adaptive CNN, more convolutional filters are applied to the input image data and/or feature maps corresponding to the input image data. In both configurations, common convolutional filters share the same convolutional filter coefficients during inference.

Figure 3:
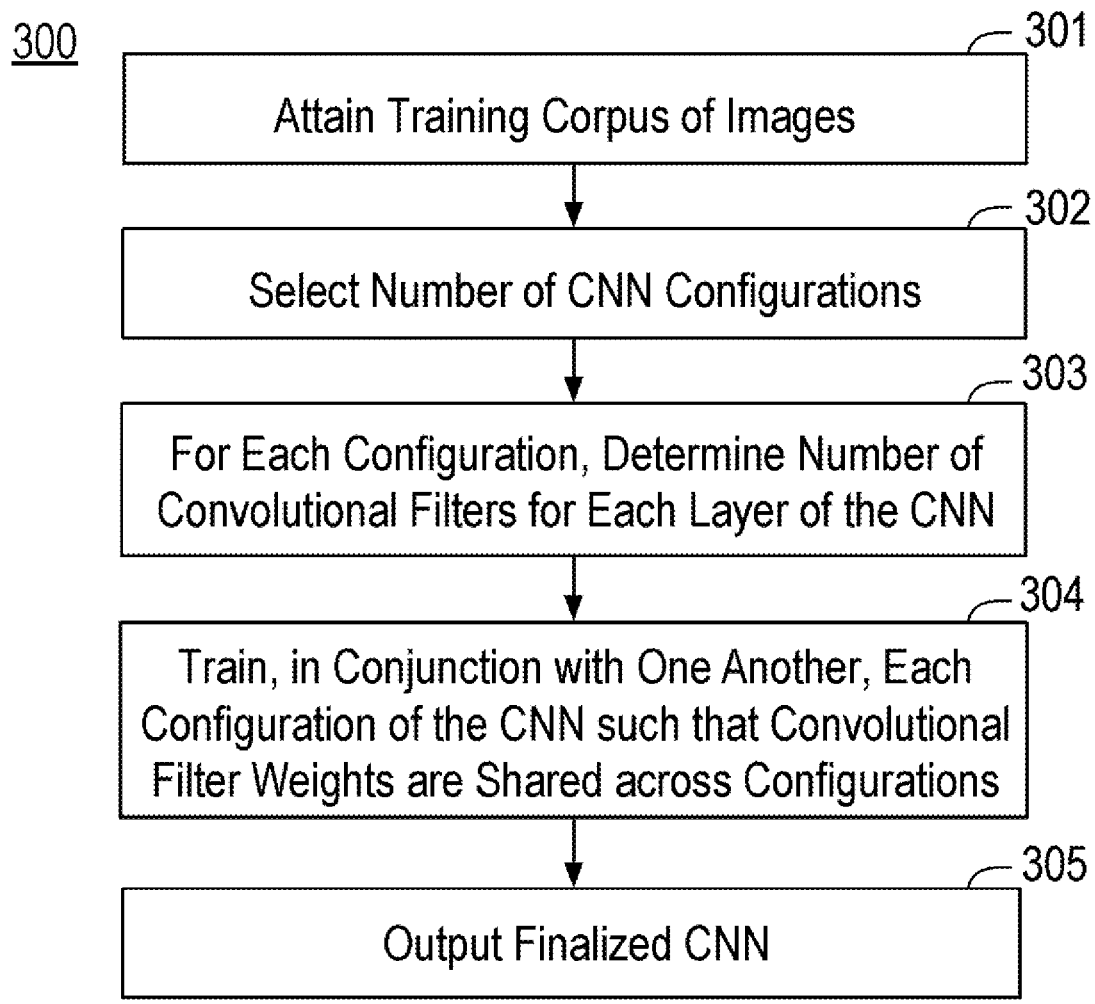
FIG. 3 is a flow diagram illustrating an example process for training an adaptive CNN.

FIG. 3 is a flow diagram illustrating an example process 300 for training an adaptive CNN, arranged in accordance with at least some implementations of the present disclosure. Process 300 may include one or more operations 301-305 as illustrated in FIG. 3. Process 300 may be performed by any device or system discussed herein to train any adaptive CNN discussed herein. Process 300 or portions thereof may be repeated for any training, training sets, etc. The parameter weights generated by process 300 may be stored to memory and implemented via a processor of system 100 during inference, for example.

Process 300 begins at operation 301, where a training corpus of images are attained. For example, the training corpus may include sets of images that provide a ground truth for training. The training corpus may include any number of images, such as 15k images, 1.2M images, or more. In an embodiment, the images of the training corpus have the same resolution and each image is of the same format, such as any format discussed with respect to image data 111 or input image data 112.

Processing continues at operation 302, where a number of configurations for the adaptive CNN are selected. For example, a number N of possible of CNN (e.g., neural net) configurations are selected. The number of configurations may be any suitable number, such as 2, 4, 8, or more. More configurations levels provide more freedom for selection of more appropriate CNN configuration taking into the available computational resources (e.g., accounting for speed vs. accuracy trade off during inference) at the cost of more difficult and less accurate training. Fewer configurations provide faster and more accurate training at the cost of less selection granularity in inference.

Processing continues at operation 303, where, for each of the configurations selected at operation 302, a number of convolutional filters are selected for each layer of the CNN. For example, for each configuration, i=0 . . . N−1, a number of used convolutional filters (e.g., output channels), $CN_{i,l}$, for each layer l of the adaptive CNN are selected. In an embodiment, a full CNN architecture is selected including a number of convolutional layers, a number of convolutional filters in each layer, a fully connected layer configuration, etc. The full CNN architecture may include any number of convolutional layers each having any number of convolutional filters. Each configuration, moving from less and less accurate CNN configurations, of the adaptive CNN then eliminates one or more convolutional filters from one or more convolutional layers of the CNN. In an embodiment, moving from less and less accurate CNN configurations, at least one convolutional filter is removed from each convolutional layer of the CNN.

In an embodiment, the number of used convolutional filters for a particular configuration, $CN_{i,l}$, is defined as shown in Equation (1):

$$CN_{i,l} = \frac{W_l}{N}(N - i) \qquad (1)$$

where $W_l$ is maximum width (number of channels) of layer l of the CNN. For example, Equation (1) may provide for a linear reduction in the number of convolutional filters at each convolutional layer of the CNN.

Processing continues at operation 304, where the N, configurations of the adaptive CNN are trained together with all convolutional filter weights being shared and common loss functions being applied during training. Since all weights are shared during training, the selected channel subset are used (e.g., each channel corresponding to a convolutional filter) and the loss function is solved to provide the CNN configurations having different qualities and speeds.

Figure 4:
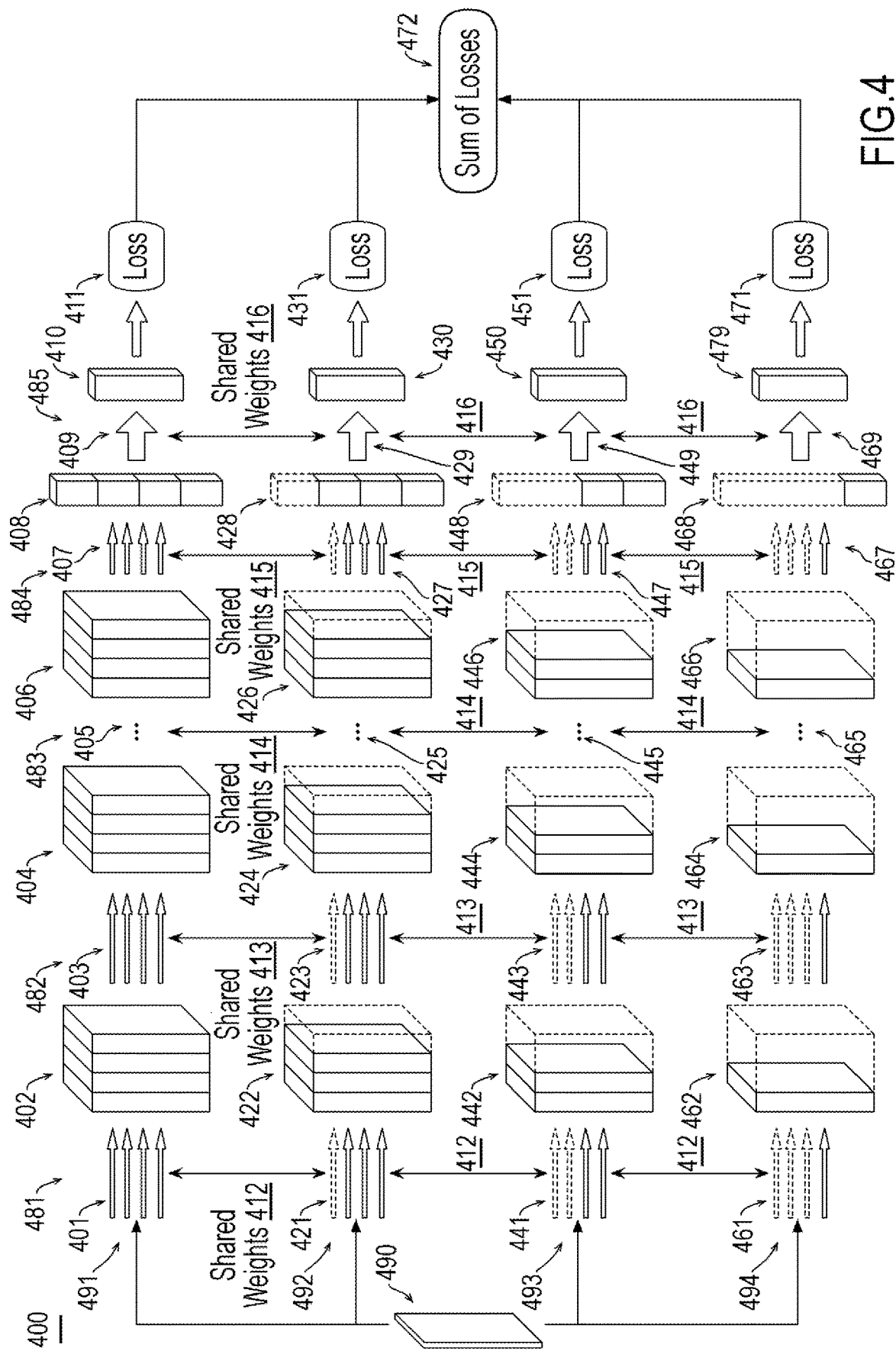
FIG. 4 illustrates exemplary training of an example adaptive CNN.

FIG. 4 illustrates exemplary training of an example adaptive CNN 400, arranged in accordance with at least some implementations of the present disclosure. As shown, adaptive CNN 400 includes any number of convolutional layers 481, 482, 483, 484, and one or more fully connected layers 485. Furthermore, adaptive CNN 400 includes any number of configurations 491, 492, 493, 494 such that one or more of convolutional layers 481, 482, 483, 484 implement different numbers of convolutional filters between configurations 491, 492, 493, 494.

For example, in configuration 491 (e.g., a full CNN configuration), at convolutional layer 481, each of available convolutional filters 401 are applied to input image data 490 to generate feature maps 402. At convolutional layer 482 of configuration 491, each of available convolutional filters 403 are applied to feature maps 402 to generate feature maps 404. Furthermore, at any additional convolutional layers 483 of configuration 491, each of available convolutional filters 405 are applied to feature maps 404 (and subsequent feature maps, as applicable) to generate feature maps 406. At convolutional layer 484 of configuration 491, each of available convolutional filters 407 are applied to feature maps 406 (or feature maps 404 if no intervening convolutional layers are implemented) to generate a feature vector 408. Notably, at convolutional layer 484, each convolutional filter has a kernel size equal to the size of input feature maps 406, 426, 446, 466 such that convolutional layer 484 produces output channels with 1×1 sizes to provide feature vectors 408, 428, 448, 468. For example, convolutional layer 484 may provide an output similar to a fully connected layer (e.g., a 1×1 channel provides a single feature). In other embodiments, convolutional layer may be a fully connected layer. As used herein, the term fully connected layer weights indicates the weights of a convolutional layer providing a feature vector or weights of any suitable fully connected layer to provide a feature vector. As shown, a fully connected layer 409 may be applied to feature vector 408 to generate class probabilities 410 (e.g., analogous to CNN output data 113), which are provided to a loss function 411. In FIG. 4 and elsewhere herein, each convolutional layer may also include pooling and rectified linear unit (ReLU) layers or any other deep network operations, as is known in the art. Such operations are not shown for the sake of clarity of presentation.

In configuration 492 (e.g., a lower quality/higher speed CNN configuration), at convolutional layer 481, a subset 421 of available convolutional filters 401 are applied to input image data 490 to generate feature maps 422 (the dashed lines indicate the convolutional filter is not applied, the feature map is not generated, etc. in FIG. 4 and elsewhere herein). As shown, the number of feature maps 422 corresponding to the number of convolutional filters in subset 421. At convolutional layer 482 of configuration 492, a subset 423 of available convolutional filters 403 are applied to feature maps 422 to generate feature maps 424. Furthermore, at any additional convolutional layers 483 of configuration 492, subsets 425 of available convolutional filters 405 are applied to feature maps 424 (and subsequent feature maps, as applicable) to generate feature maps 426. At convolutional layer 484 of configuration 492, a subset 427 of available convolutional filters 407 are applied to feature maps 426 (or feature maps 424 if no intervening convolutional layers are implemented) to generate a feature vector 428. Notably, each convolutional layer (or fully connected layer) implements fewer convolutional filters (or channels) to generate fewer feature maps (or a smaller feature vector). As shown, a subset 429 of available fully connected layer weights 409 is applied to feature vector 428 to generate class probabilities 430, which are provided to a loss function 431.

Similarly, in configuration 493 (e.g., a yet lower quality/higher speed CNN configuration), at convolutional layer 481, a subset 441 of available convolutional filters 401 are applied to input image data 490 to generate feature maps 442 with the number of feature maps 442 corresponding to the number of convolutional filters in subset 441. At convolutional layer 482 of configuration 493, a subset 443 of available convolutional filters 403 are applied to feature maps 442 to generate feature maps 444. Furthermore, at any additional convolutional layers 483 of configuration 493, subsets 445 of available convolutional filters 405 are applied to feature maps 444 (and subsequent feature maps, as applicable) to generate feature maps 446. At convolutional layer 484 of configuration 493, a subset 447 of available convolutional filters 407 are applied to feature maps 446 (or feature maps 444 if no intervening convolutional layers are implemented) to generate a feature vector 448. Notably, each convolutional layer (or fully connected layer) implements fewer convolutional filters (or channels) to generate fewer feature maps (or smaller feature vector). As shown, a subset 449 of available fully connected layer weights 409 is applied to feature vector 448 to generate class probabilities 450 (e.g., analogous to CNN output data 113), which is provided to a loss function 451.

Finally, in configuration 494 (e.g., a lowest quality/higher speed CNN configuration), at convolutional layer 481, a subset 461 of available convolutional filters 401 are applied to input image data 490 to generate feature maps 462 with the number of feature maps 462 corresponding to the number of convolutional filters in subset 461. At convolutional layer 482 of configuration 494, a subset 463 of available convolutional filters 403 are applied to feature maps 462 to generate feature maps 464. Furthermore, at any additional convolutional layers 483 of configuration 494, subsets 465 of available convolutional filters 405 are applied to feature maps 464 (and subsequent feature maps, as applicable) to generate feature maps 466. At convolutional layer 484 of configuration 494, a subset 467 of available convolutional filters 407 are applied to feature maps 466 (or feature maps 464 if no intervening convolutional layers are implemented) to generate a feature vector 468. Notably, each convolutional layer (or fully connected layer) implements fewer convolutional filters (or channels) to generate fewer feature maps (or smaller feature vector). As shown, a subset 469 of available fully connected layer weights 409 is applied to feature vector 468 to generate class probabilities 479 (e.g., analogous to CNN output data 113), which are provided to a loss function 471.

Loss functions 411, 431, 451, 471 determine loss functions or values, which are summed at loss function 472. Notably, adaptive CNN 400 is trained to minimize the sum of loss functions 411, 431, 451, 471 at summed loss function 472.

Returning to FIG. 3, processing continues at operation 304, where each configuration of the adaptive CNN are trained in conjunction with one another to train shared convolutional filter weights that are shared across the configurations. With reference to FIG. 4, as shown, filter weights are shared, via shared filter weights 412 (e.g., pretrained filter weights after training), such that the weights of available convolutional filters 401 are trained and implemented at each of configuration 491, 492, 493, 494. That is, the filter weights of the convolutional filters in subset 461 in configuration 494 are the same as the filter weights, for corresponding convolutional filters, as those of the convolutional filters in subset 441, 421, 401 of configurations 493, 492, 491, respectively. For example, assuming subset 461 implements two convolutional filters, A and B, subset 441 implements four convolutional filters, A, B, C, and D, subset 421 implements six convolutional filters, A, B, C, D, E, and F, and available convolutional filters 401 implement eight convolutional filters, A, B, C, D, E, F, G, and H, at each of configuration 491, 492, 493, 494, each of convolutional filters A, B, C, D, E, F, G, and H (when applicable) have shared filter weights 421. Due to such shared filter weights 421 and shared application of the convolutional filters, feature maps 402, 422, 442, 462 also all have the same resolution (although the number of feature maps 402, 422, 442, 462 or channels changes between configuration 491, 492, 493, 494).

In a similar manner, filter weights are shared, via shared filter weights 413 (e.g., pretrained filter weights after training), such that the weights of available convolutional filters 403 are trained and implemented at each of configuration 491, 492, 493, 494. The filter weights of the convolutional filters as applied in subset 463, 443, 423, and available convolutional filters 403 are the same as the filter weights, for corresponding convolutional filters, therebetween. Such filter weight sharing is also applied between subsets 465, 445, 425, and available convolutional filters 405 as shown with respect to shared weights 414 (e.g., pretrained filter weights after training) as well as between subsets 467, 447, 427, and available convolutional filters 407 as shown with respect to shared weights 415 (e.g., pretrained filter weights after training). Furthermore, fully connected layers 409, 429, 449, 469 share filter weights as shown with respect to shared weights 416.

With reference to operation 304, training of adaptive CNN 400 may be performed using any suitable technique or techniques such that weight sharing is maintained. As used herein, the term training configurations in conjunction with one another indicates the configurations are trained with shared filter weights and a shared loss function. In some embodiments, channel wise drop out techniques may be used.

Figure 5:
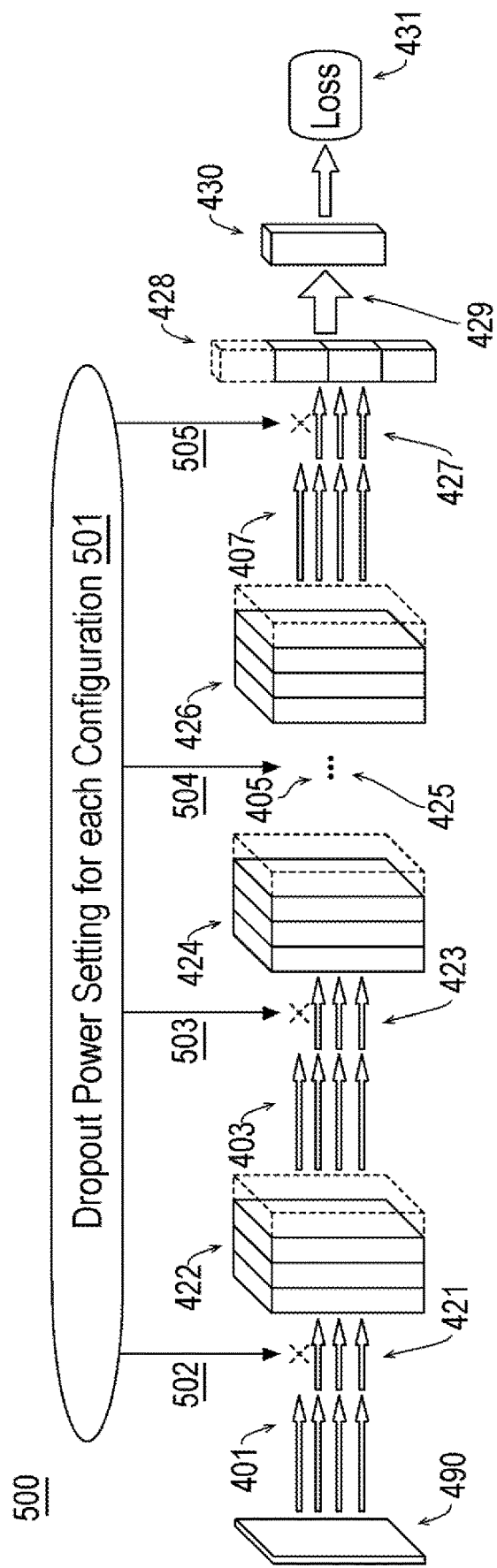
FIG. 5 illustrates example channel wise drop out CNN training techniques.

FIG. 5 illustrates example channel wise drop out CNN training techniques 500, arranged in accordance with at least some implementations of the present disclosure. As shown, a dropout power setting for each configuration module 501 may provide indications 502, 503, 504, 505 to eliminate one or more convolutional filters from available convolutional filters 401, 403, 405, 507 during training to simulate subsets of available convolutional filters 401, 403, 405, 507 as illustrated with respect to subsets 421, 423, 425, 427.

In any case, at each iteration of training adaptive CNN 400, forward propagation and backward propagation are performed N times (once for each configuration) and batch gradient descents are accumulated. As shown, in some embodiments, a forward propagation and a backward propagation are performed a number of forward and backward propagations equal to the number of available configurations to determine batch gradient descents. In some embodiments, a forward propagation and a backward propagation are performed for a single randomly or iteratively chosen configuration to determine batch gradient descents. That is, at each iteration of training adaptive CNN 400, forward and backward propagation is performed 1 time for randomly or iteratively chosen configuration. Such processing is repeated for any number of iterations (e.g., epochs) until a convergence condition is met, a maximum number of iterations is met, or the like.

Returning to FIG. 3, processing continues at operation 305, where the resultant filter weights (e.g., parameter weights) of adaptive CNN 400 are output. For example, the predefined architecture of adaptive CNN 400 and resultant filter weights after training may be stored to memory and/or transmitted to another device for implementation during an inference phase as discussed herein.

With reference to FIG. 4, as discussed, adaptive CNN 400 may have any number of configurations. Furthermore, in the illustrated embodiment, between each of configurations 491, 492, 493, 494, each convolutional layer 481, 482, 483, 484 and fully connected layer 485 has a different number of convolutional filters and weights. In other embodiments, some of convolutional layers 481, 482, 483, 484 and/or fully connected layer 485 have the same number of convolutional filters or channels between some of configurations 491, 492, 493, 494. Furthermore, as discussed with respect to Equation (1), in some embodiments, the number of convolutional filters (or channels) may be reduced in a linear manner. In an embodiment, a ratio of the number of convolutional filters in available convolutional filters 401 to the number of convolutional filters in subset 421 is the same as a ratio of the number of convolutional filters in available convolutional filters 403 to the number of convolutional filters in subset 423. Similar ratios between numbers of convolutional filters or channels along configurations 491, 492 may also be the same and such ratios may match between other combinations of configurations 491, 492, 493, 494. In some embodiments, the number of convolutional filters in available convolutional filters 401 is not less than twice the number of convolutional filters in subset 421, which is not less than twice the number of convolutional filters in subset 441, which is not less than twice the number of convolutional filters in subset 461. Similar characteristics may be provided with respect to the number of convolutional filters in convolutional layers 482, 483, 484 and fully connected layer 485.

In some embodiments, the reduction in the number of convolutional filters or channels for one or more of convolutional layer 481, 482, 483, 484 and/or fully connected layer 485 between configurations 491, 492, 493, 494 may be non-linear. In particular, in some embodiments, the reduction in the number of convolutional filters or channels between configuration 491 and configuration 492 may be less than the reduction in the number of convolutional filters or channels between configuration 492 and configuration 493, which may, in turn, be less than the reduction in the number of convolutional filters or channels between configuration 493 and configuration 494. Such reduction characteristics may advantageously offer more configurations at or near peak computational resource availability and therefore less loss in accuracy as minor computational resource reduction are needed.

As discussed, several configurations of the same adaptive CNN model are defined such that the configurations have different numbers output channels (e.g., convolutional filters) for each layer of the adaptive CNN. The configurations are trained together (e.g., in conjunction with each other) using shared weights and common loss. The resultant pretrained model can be configured on the fly during inference for different computational resource budgets for execution. Using the discussed techniques, reasonable accuracy loss is maintained in the case of small computational resource budgets. Furthermore, the resultant full computational resource budget CNN provides high accuracy and, again, a reasonable loss as compared to training the full CNN alone.

In inference, such adaptive CNNs offer a variety of advantages including the advantage of not skipping video images or frames due to low computational resources, not increasing the number of weights for implementation of the CNN, robust computer vision results even in low or highly variable computational resource environments, and the simplicity of training and operating a single CNN.

Figure 6:
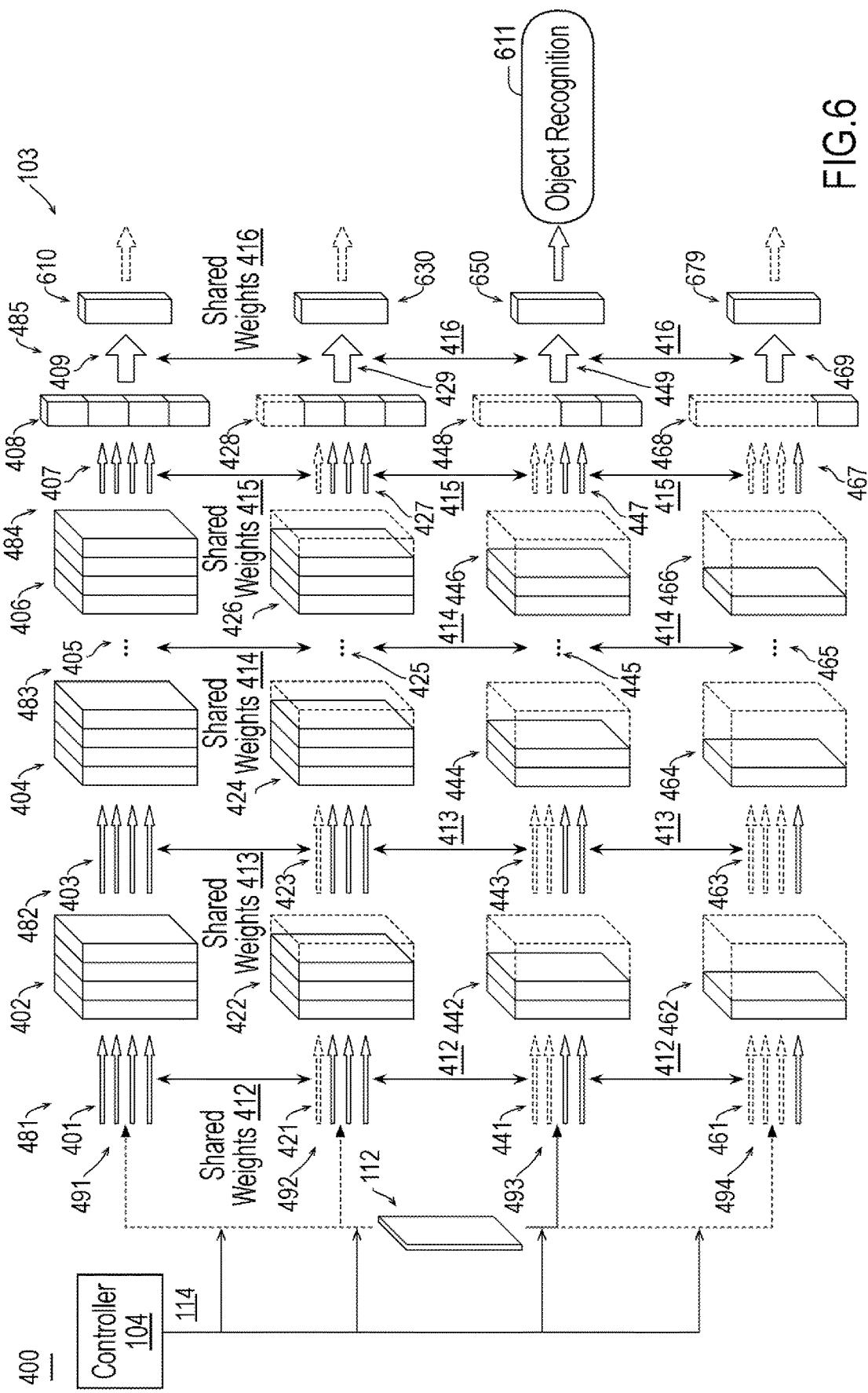
FIG. 6 illustrates exemplary object recognition inference using example adaptive CNN.

FIG. 6 illustrates exemplary object recognition inference using example adaptive CNN 400, arranged in accordance with at least some implementations of the present disclosure. As shown, adaptive CNN 400, as implemented by adaptive CNN module 103, may be configured to one of configurations 491, 492, 493, 494 based on CNN configuration data 114 as received from controller 104.

In the example of FIG. 6, adaptive CNN 400 is configured to configuration 493. For example, in response to a particular computational resource level available for processing input image data 112, configuration 493 may be selected. In configuration 493, only subset 441 of available convolutional filters 401 are applied to input image data 112 at convolutional layer 481, only subset 443 of available convolutional filters 403 are applied to feature maps 442 at convolutional layer 482, only subsets 445 of available convolutional filters 405 are applied to feature maps 444 at convolutional layer(s) 483 (if any), only subset 447 of available convolutional filters 407 are applied to feature maps 446 (or feature maps 444), and only subset 449 of fully connected weights 409 is applied to feature vector 448 to generate class probabilities 650. Notably, some of the available convolutional filters and fully connected layers or nodes are not applied when configuration 493 is implemented. As used herein, the term only indicates a portion or subset of a set or group are used while another portion or subset of a set or group are not used. For example, the unused portion or subset may be characterized as unused, discarded, idle, etc.

As shown, in configuration 493, processing is performed such that subset 441 of available convolutional filters 401 of convolutional layer 481 are applied to input image data 112 to generate corresponding feature maps 442 having a number thereof that matches the number of convolutional filters in subset 441 (e.g., 16 convolutional filters out of 32 available convolutional filters). Subset 443 of available convolutional filters 403 of convolutional layer 482 are applied to feature maps 442 to generate corresponding feature maps 444 having a number thereof that matches the number of convolutional filters in subset 443 (e.g., 16 convolutional filters out of 32 available convolutional filters). If applicable, one or more subsets 445 of one or more sets of available convolutional filters 405 of one or more convolutional layers 483 are applied to feature maps 444 (and subsequently formed feature maps) to generate corresponding feature maps 446 having a number thereof that matches the number of convolutional filters in final subset of subsets 445. Subset 447 of available convolutional filters 407 are applied to feature maps 446 (or feature maps 444 if no intervening one or more convolutional layers 483 are implemented) to generate feature vector 448 having a number of features thereof that matches the number of convolutional filters of subset 447 (e.g., 32 convolutional filters out of 64 available convolutional filters). Fully connected layer 449 is applied to feature vector 448 to generate class probabilities 650, which indicate a probability for each of the available classes that an object corresponding to the class is in input image data 112. For example, class probabilities 650 may indicate include a score in the range of zero to one for each available class (e.g., car, person, truck, dog, street light, etc.) with increasing probability scores indicating increasing likelihood image data 112 includes an object of the corresponding object class.

Adaptive CNN 400 may be configured to any number of configurations such as configurations 491, 492, 493, 494 based on CNN configuration data 114. For example, in response to change in the computational resource level available for processing subsequent input image data 112, configuration 491, 492, or 494 may be selected. In an embodiment, in response to a change to another computational resource level greater than the previously discussed computational resource level available for processing second input image data 112, configuration 491 or 492. With respect to configuration 493, in both of configurations 491, 492, each convolutional filter in subset 441 and one or more additional convolutional filters of available convolutional filters 401 are applied at convolutional layer 481 to second input image data 112. Notably, subset 421 includes all convolutional filters in subset 441 and additional convolutional filters. Available convolutional filters 401 include all convolutional filters in subset 441 (and those in subset 421) and, indeed, include all available convolutional filters 401 of convolutional layer 481. Similarly, in both of configurations 491, 492, each convolutional filter in subsets 443, 445 and one or more additional convolutional filters of available convolutional filters 403, 405, respectively are applied at convolutional layers 482, 483 to the corresponding feature maps, as illustrated. Furthermore, in both of configurations 491, 492, each convolutional filter in subset 447 and one or more additional convolutional filter of available convolutional filters 407, respectively are applied at convolutional layer 484 to the corresponding feature maps. As discussed herein, those convolutional filters shared between configurations apply the same filter coefficients. Similarly, the fully connected layer weights shared between configurations apply the same coefficients and parameters.

For example, in a highest accuracy highest computational resource load configuration, configuration 491 is selected and processing is performed in analogy to the processing discussed with respect to configuration 493 such that all of available convolutional filters 401 of convolutional layer 481 are applied to input image data 112 to generate corresponding feature maps 402, all of available convolutional filters 403 of convolutional layer 482 are applied to feature maps 402 to generate corresponding feature maps 404, all convolutional filters 405 of one or more convolutional layers 483 are applied to feature maps 404 (and subsequently formed feature maps) to generate corresponding feature maps 406, all available convolutional filters 407 are applied to feature maps 446 (or feature maps 444 if no intervening one or more convolutional layers 483 are implemented) to generate feature vector 408, and fully connected layer 409 is applied to feature vector 408 to generate class probabilities 610.

Furthermore, in a lowest accuracy lowest computational resource load configuration, configuration 494 is selected and processing is such that subset 461 of available convolutional filters 401 of convolutional layer 481 are applied to input image data 112 to generate corresponding feature maps 462, subset 463 of available convolutional filters 403 of convolutional layer 482 are applied to feature maps 462 to generate corresponding feature maps 464, if applicable, one or more subsets 465 of one or more sets of available convolutional filters 405 of one or more convolutional layers 483 are applied to feature maps 444 (and subsequently formed feature maps) to generate corresponding feature maps 466, subset 467 of available convolutional filters 407 are applied to feature maps 466 (or feature maps 464 if no intervening one or more convolutional layers 483 are implemented) to generate feature vector 468, and fully connected layer 469 is applied to feature vector 468 to generate class probabilities 679. Similar processing may be applied with respect to configuration 492 to generate class probabilities 630.

In any event, class probabilities 610, 630, 650, or 679 are provided as output from adaptive CNN module 103 for use in any suitable image processing, object tracking, object recognition, artificial intelligence, etc. application. In the illustrated embodiment, class probabilities 610, 630, 650, or 679 are provided to an object recognition module 611 for use in object recognition or detection. As used herein, the term object recognition indicator indicates any data or data structure indicating object recognition or detection such as one or more class probabilities, one or more locations of detected objects within image data, a flag indicating an object is detected in image data, etc.

Adaptive CNN 400 may have any characteristics discussed with respect to FIG. 4. Notably, the convolutional filters, layers, shared weights, fully connected layers, etc. as shown in FIG. 6 are finalized, trained parameters of adaptive CNN 400 (e.g., pretrained parameters of adaptive CNN 400) used for implementation. Furthermore, the discussed processing may be repeated for any number of input images represented by input image data 112. Between any of such input images, a different one of configurations 491, 492, 493, 494 may be selected for processing. However, such configurations 491, 492, 493, 494 may also remain constant for any number of input images. Such changing between configurations 491, 492, 493, 494 may occur when computation resources vary, for example.

FIG. 7 is a flow diagram illustrating an example process 700 for performing object recognition using a convolutional neural network that is adaptive based on available computational resources, arranged in accordance with at least some implementations of the present disclosure. Process 700 may include one or more operations 701-703 as illustrated in FIG. 7. Process 700 may form at least part of an object recognition process. By way of non-limiting example, process 700 may form at least part of an object recognition process performed by system 100 as discussed herein. Furthermore, process 700 will be described herein with reference to system 800 of FIG. 8.

FIG. 8 is an illustrative diagram of an example system 800 for performing object recognition using a convolutional neural network that is adaptive based on available computational resources, arranged in accordance with at least some implementations of the present disclosure. As shown in FIG. 8, system 800 includes one or more central processing units 801 (i.e., central processor(s)), a graphics processing unit 802 (i.e., graphics processor), and memory stores 803. Also as shown, graphics processing unit 802 may include or implement normalization module 102, adaptive CNN module 103, and controller 104. Such modules may be implemented to perform operations as discussed herein. In the example of system 800, memory stores 803 may store input image data, CNN characteristics and parameters data, convolutional filter coefficients, feature maps, feature vectors, CNN output data, class probabilities, or any other data or data structure discussed herein.

As shown, in some examples, normalization module 102, adaptive CNN module 103, and controller 104 are implemented via graphics processing unit 802. In other examples, one or both or portions of normalization module 102, adaptive CNN module 103, and controller 104 are implemented via central processing units 801 or an image processing unit (not shown) of system 800. In yet other examples, one or both or portions of view normalization module 102, adaptive CNN module 103, and controller 104 are implemented via an imaging processing pipeline, graphics pipeline, or the like.

Graphics processing unit 802 may include any number and type of graphics processing units that may provide the operations as discussed herein. Such operations may be implemented via software or hardware or a combination thereof. For example, graphics processing unit 802 may include circuitry dedicated to manipulate image data, CNN data, etc. obtained from memory stores 803. Central processing units 801 may include any number and type of processing units or modules that may provide control and other high level functions for system 800 and/or provide any operations as discussed herein. Memory stores 803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 803 may be implemented by cache memory. In an embodiment, one or both or portions of view synthesis network 92 and image super-resolution CNN 93 are implemented via an execution unit (EU) of graphics processing unit 802. The EU may include, for example, programmable logic or circuitry such as a logic core or cores that may provide a wide array of programmable logic functions. In an embodiment, one or both or portions of view normalization module 102, adaptive CNN module 103, and controller 104 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or both or portions of view normalization module 102, adaptive CNN module 103, and controller 104 are implemented via an application specific integrated circuit (ASIC). The ASIC may include an integrated circuitry customized to perform the operations discussed herein.

Returning to discussion of FIG. 7, process 700 begins at operation 701, where, in response to a first computational resource level available for processing first input image data, only a first subset of available convolutional filters are applied at a convolutional layer of a convolutional neural network (CNN) to first feature maps corresponding to the first input image data.

Processing continues at operation 702, where, in response to a change to a second computational resource level greater than the first computational resource level available for processing second input image data, the first subset and one or more additional convolutional filters of the available convolutional filters are applied at the convolutional layer of the CNN to second feature maps corresponding to the second input image data. Notably, applying the first subset of available convolutional filters to the first feature maps and applying the first subset of available convolutional filters to the second feature maps includes applying the same pretrained filter weights. Furthermore, applying the first subset of convolutional filters generates a number of third feature maps equal to the number of convolutional filters in the first subset of convolutional filters and applying the first subset and the one or more additional convolutional filters generates a number of fourth feature maps equal to the number of third feature maps plus the number of additional convolutional filters such that the third feature maps and the fourth feature maps are all of the same resolution.

In some embodiments, process 700 further includes applying, in response to the first computational resource level, only a second subset of second available convolutional filters at a second convolutional layer of the CNN to the first input image data and applying, in response to the second computational resource level, the second subset and one or more additional second convolutional filters of the second available convolutional filters at the second convolutional layer of the CNN to the second input image data. In some embodiments, a ratio of a number of convolutional filters in the first subset to a number of convolutional filters in the first subset plus the one or more additional convolutional filters is the same as a second ratio of a number of convolutional filters in the second subset to a number of convolutional filters in the second subset plus the one or more additional second convolutional filters.

In some embodiments, process 700 further includes applying, in response to the first computational resource level, only a second subset of available fully connected channels at a second layer of the CNN to third feature maps corresponding to the first input image data and applying, in response to the second computational resource level, the second subset and one or more additional fully connected channels of the second available convolutional filters at the second convolutional layer of the CNN to fourth feature maps corresponding to the second input image data.

In some embodiments, process 700 further includes applying, in response to a change to a third computational resource level less than the first computational resource level available for processing third input image data, only a second subset of available convolutional filters at the convolutional layer of the CNN to third feature maps corresponding to the third input image, such that the second subset has fewer convolutional filters than the first subset and each convolutional filter of the second subset is in the first subset. In some embodiments, a number of convolutional filters in the first subset is not less than twice a number of convolutional filters in the second subset and a number of convolutional filters in the first subset and the one or more additional convolutional filters is not less than twice the number of convolutional filters in the first subset.

Processing continues at operation 703, where first and second object recognition indicators are transmitted for the first and second images, respectively, based at least in part on said applications of the convolutional layer of the CNN. The first and second object recognition indicators may include any suitable object recognition or detection indicators such as class probability scores, one or more locations of detected objects within image data, or one or more flags indicating an object is detected in image data.

In some embodiments, process 700 further includes training the CNN. In some embodiments, training the CNN includes selecting a number of available configurations for the CNN, determining a number of convolutional filters for application at each convolutional layer for each of the available configurations, and training, each of the available configurations in conjunction with one another such that common convolutional filters of the available configurations share filter waits in the training, to generate finalized weights for the CNN. In some embodiments, training each of the available configurations includes, at each of a plurality of training iterations performing a number of back-propagations equal to the number of available configurations to determine batch gradient descents and updating convolutional filter waits using the batch gradient descents. In some embodiments, training each of the available configurations, at each of a plurality of training iterations, includes a layer-wise dropout of convolutional filters at each convolutional layer to train the full CNN and, subsequently, reduced CNN configurations.

Process 700 may provide for generating object recognition or detection data for any number of input images. Process 700 may be repeated any number of times either in series or in parallel for any number of input images, input images of a video sequence of input images, video frames, etc.

Various components of the systems described herein may be implemented in software, firmware, and/or hardware and/or any combination thereof. For example, various components of devices or systems discussed herein may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the discussed operations, modules, or components discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
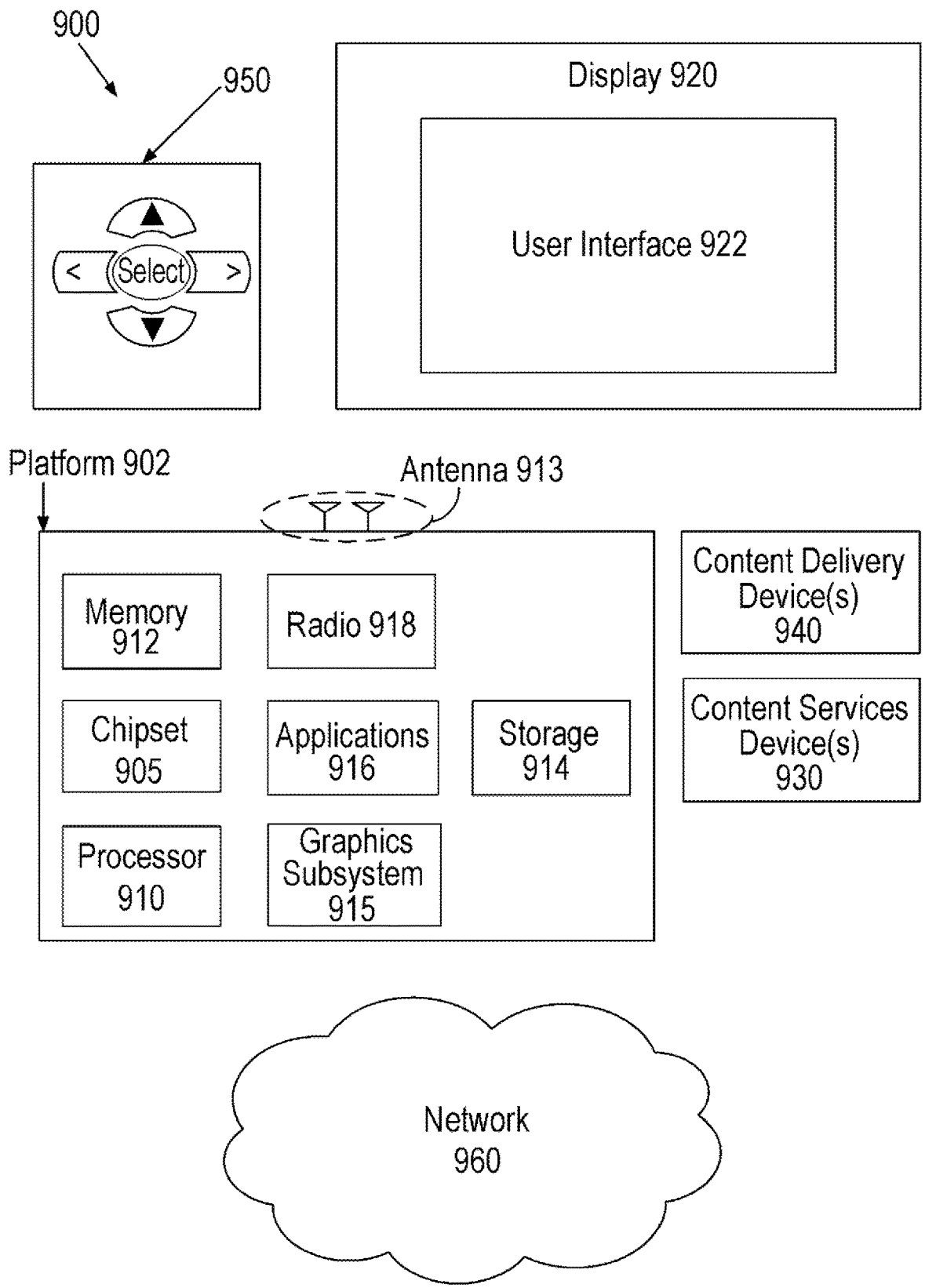
FIG. 9 is an illustrative diagram of an example system.

FIG. 9 is an illustrative diagram of an example system 900, arranged in accordance with at least some implementations of the present disclosure. In various implementations, system 900 may be a computing system although system 900 is not limited to this context. For example, system 900 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, gaming console, wearable device, display device, all-in-one device, two-in-one device, and so forth.

In various implementations, system 900 includes a platform 902 coupled to a display 920. Platform 902 may receive content from a content device such as content services device(s) 930 or content delivery device(s) 940 or other similar content sources such as a camera or camera module or the like. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still images, graphics, or video for display. Graphics subsystem 915 may be a graphics processing unit (GPU), a visual processing unit (VPU), or an image processing unit, for example. In some examples, graphics subsystem 915 may perform scanned image rendering as discussed herein. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any flat panel monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of uni-directionally or bi-directionally communicating content between content providers and platform 902 and/display 920, via network 960 or directly. It will be appreciated that the content may be communicated uni-directionally and/or bi-directionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of navigation controller 950 may be used to interact with user interface 922, for example. In various embodiments, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In various embodiments, navigation controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 5.1 surround sound audio and/or high definition 9.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
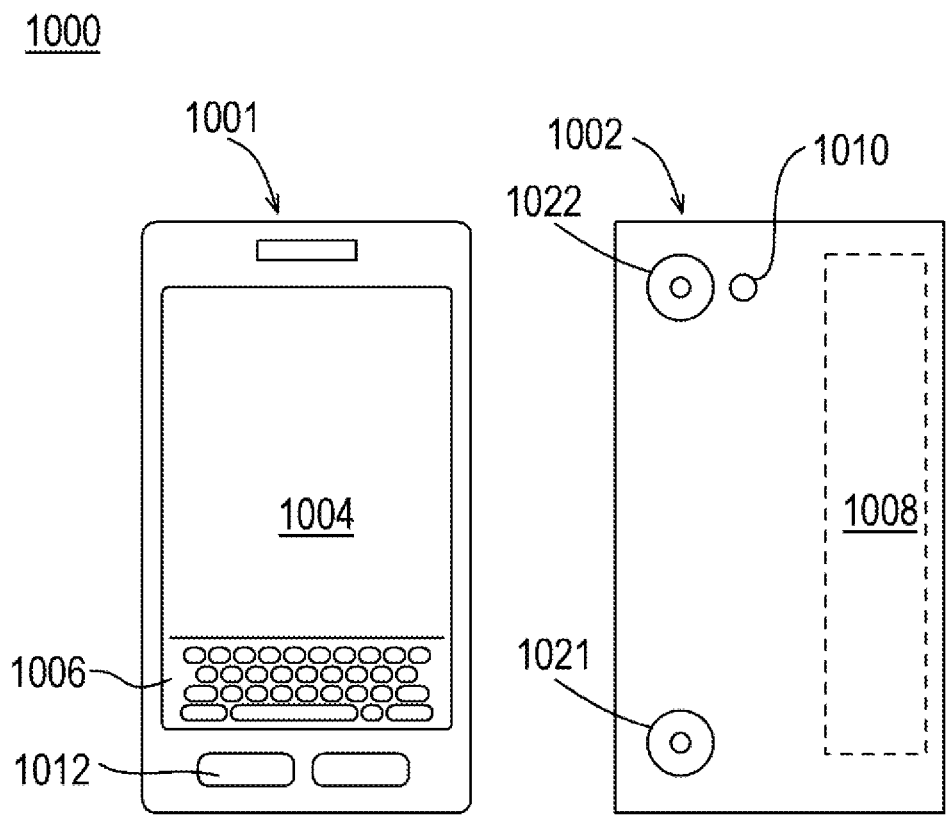
FIG. 10 illustrates an example device, all arranged in accordance with at least some implementations of the present disclosure.

As described above, system 900 may be embodied in varying physical styles or form factors. FIG. 10 illustrates an example small form factor device 1000, arranged in accordance with at least some implementations of the present disclosure. In some examples, system 900 may be implemented via device 1000. In other examples, other systems, components, or modules discussed herein or portions thereof may be implemented via device 1000. In various embodiments, for example, device 1000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 10, device 1000 may include a housing with a front 1001 and a back 1002. Device 1000 includes a display 1004, an input/output (I/O) device 1006, a color camera 1021, a color camera 1022, and an integrated antenna 1008. For example, color camera 1021 and color camera 1022 and may input image data (e.g., left and right images) as discussed herein. Device 1000 also may include navigation features 1012. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone (not shown), or may be digitized by a voice recognition device. As shown, device 1000 may include color cameras 1021, 1022, and a flash 1010 integrated into back 1002 (or elsewhere) of device 1000. In other examples, color cameras 1021, 1022, and flash 1010 may be integrated into front 1001 of device 1000 or both front and back sets of cameras may be provided. Color cameras 1021, 1022 and a flash 1010 may be components of a camera module to originate color image data that may be processed into an image or streaming video that is output to display 1004 and/or communicated remotely from device 1000 via antenna 1008 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for performing object recognition comprising:
a memory to store first and second input image data; and
a processor coupled to the memory, the processor to:
apply, in response to a first computational resource level available for processing the first input image data, only a first subset of available convolutional filters at a convolutional layer of a convolutional neural network (CNN) to first feature maps corresponding to the first input image data;
apply, in response to a change to a second computational resource level greater than the first computational resource level available for processing the second input image data, the first subset and one or more additional convolutional filters of the available convolutional filters at the convolutional layer of the CNN to second feature maps corresponding to the second input image data; and
transmit first and second object recognition indicators for the first and second images, respectively.

2. The system of claim 1, wherein the processor to apply the first subset of available convolutional filters to the first feature maps and to apply the first subset of available convolutional filters to the second feature maps comprises the processor to apply the same pretrained filter weights.

3. The system of claim 1, wherein the processor to apply the first subset of convolutional filters generates a number of third feature maps equal to the number of convolutional filters in the first subset of convolutional filters and the processor to apply the first subset and the one or more additional convolutional filters generates a number of fourth feature maps equal to the number of third feature maps plus the number of additional convolutional filters.

4. The system of claim 3, wherein the third feature maps and the fourth feature maps are all of the same resolution.

5. The system of claim 1, wherein the processor is further to:
apply, in response to the first computational resource level, only a second subset of second available convolutional filters at a second convolutional layer of the CNN to the first input image data; and
apply, in response to the second computational resource level, the second subset and one or more additional second convolutional filters of the second available convolutional filters at the second convolutional layer of the CNN to the second input image data.

6. The system of claim 5, wherein a ratio of a number of convolutional filters in the first subset to a number of convolutional filters in the first subset plus the one or more additional convolutional filters is the same as a second ratio of a number of convolutional filters in the second subset to a number of convolutional filters in the second subset plus the one or more additional second convolutional filters.

7. The system of claim 1, wherein the processor is further to:
apply, in response to the first computational resource level, only a second subset of available fully connected weights at a second layer of the CNN to third feature maps corresponding to the first input image data; and
apply, in response to the second computational resource level, the second subset and one or more additional fully connected weights of the second available fully connected weights at the second layer of the CNN to fourth feature maps corresponding to the second input image data.

8. The system of claim 1, wherein the processor is further to:
apply, in response to a change to a third computational resource level less than the first computational resource level available for processing third input image data, only a second subset of the available convolutional filters at the convolutional layer of the CNN to third feature maps corresponding to the third input image, wherein the second subset has fewer convolutional filters than the first subset and each convolutional filter of the second subset is in the first subset.

9. The system of claim 1, wherein the processor is further to:
select a number of available configurations for the CNN;
determine a number of convolutional filters for application at each convolutional layer for each of the available configurations; and
train, each of the available configurations in conjunction with one another, wherein common convolutional filters of the available configurations share filter weights in the training, to generate finalized weights for the CNN.

10. The system of claim 9, wherein the processor to train each of the available configurations comprises, at each of a plurality of training iterations, the processor to:
perform a forward propagation and a backward propagation for a single randomly or iteratively chosen configuration or a number of forward and backward propagations equal to the number of available configurations to determine batch gradient descents; and
update convolutional filter weights using the batch gradient descents.

11. The system of claim 10, wherein the processor to train each of the available configurations, at each of a plurality of training iterations, comprises a layer-wise dropout of convolutional filters at each convolutional layer to train the full CNN and, subsequently, reduced CNN configurations.

12. A computer-implemented method for performing object recognition, comprising:
applying, in response to a first computational resource level available for processing first input image data, only a first subset of available convolutional filters at a convolutional layer of a convolutional neural network (CNN) to first feature maps corresponding to the first input image data;
applying, in response to a change to a second computational resource level greater than the first computational resource level available for processing second input image data, the first subset and one or more additional convolutional filters of the available convolutional filters at the convolutional layer of the CNN to second feature maps corresponding to the second input image data; and
transmitting first and second object recognition indicators for the first and second images, respectively.

13. The method of claim 12, further comprising:
applying, in response to the first computational resource level, only a second subset of second available convolutional filters at a second convolutional layer of the CNN to the first input image data; and
applying, in response to the second computational resource level, the second subset and one or more additional second convolutional filters of the second available convolutional filters at the second convolutional layer of the CNN to the second input image data.

14. The method of claim 13, wherein a ratio of a number of convolutional filters in the first subset to a number of convolutional filters in the first subset plus the one or more additional convolutional filters is the same as a second ratio of a number of convolutional filters in the second subset to a number of convolutional filters in the second subset plus the one or more additional second convolutional filters.

15. The method of claim 12, further comprising:
applying, in response to the first computational resource level, only a second subset of available fully connected weights at a second layer of the CNN to third feature maps corresponding to the first input image data; and
applying, in response to the second computational resource level, the second subset and one or more additional fully connected weights of the second available fully connected weights at the second layer of the CNN to fourth feature maps corresponding to the second input image data.

16. The method of claim 12, further comprising:
applying, in response to a change to a third computational resource level less than the first computational resource level available for processing third input image data, only a second subset of available convolutional filters at the convolutional layer of the CNN to third feature maps corresponding to the third input image, wherein the second subset has fewer convolutional filters than the first subset and each convolutional filter of the second subset is in the first subset.

17. The method of claim 16, wherein a number of convolutional filters in the first subset is not less than twice a number of convolutional filters in the second subset and a number of convolutional filters in the first subset and the one or more additional convolutional filters is not less than twice the number of convolutional filters in the first subset.

18. At least one non-transitory machine readable medium comprising a plurality of instructions that, in response to being executed on a computing device, cause the computing device to perform object detection by:
applying, in response to a first computational resource level available for processing first input image data, only a first subset of available convolutional filters at a convolutional layer of a convolutional neural network (CNN) to first feature maps corresponding to the first input image data;
applying, in response to a change to a second computational resource level greater than the first computational resource level available for processing second input image data, the first subset and one or more additional convolutional filters of the available convolutional filters at the convolutional layer of the CNN to second feature maps corresponding to the second input image data; and
transmitting first and second object recognition indicators for the first and second images, respectively.

19. The non-transitory machine readable medium of claim 18, the machine readable medium further comprising instructions that, in response to being executed on the device, cause the device to perform object detection by:
applying, in response to the first computational resource level, only a second subset of second available convolutional filters at a second convolutional layer of the CNN to the first input image data; and
applying, in response to the second computational resource level, the second subset and one or more additional second convolutional filters of the second available convolutional filters at the second convolutional layer of the CNN to the second input image data.

20. The non-transitory machine readable medium of claim 19, wherein a ratio of a number of convolutional filters in the first subset to a number of convolutional filters in the first subset plus the one or more additional convolutional filters is the same as a second ratio of a number of convolutional filters in the second subset to a number of convolutional filters in the second subset plus the one or more additional second convolutional filters.

21. The non-transitory machine readable medium of claim 18, the machine readable medium further comprising instructions that, in response to being executed on the device, cause the device to perform object detection by:
applying, in response to the first computational resource level, only a second subset of available fully connected weights at a second layer of the CNN to third feature maps corresponding to the first input image data; and
applying, in response to the second computational resource level, the second subset and one or more additional fully connected weights of the second available fully connected weights at the second layer of the CNN to fourth feature maps corresponding to the second input image data.

22. The non-transitory machine readable medium of claim 18, the machine readable medium further comprising instructions that, in response to being executed on the device, cause the device to perform object detection by:
applying, in response to a change to a third computational resource level less than the first computational resource level available for processing third input image data, only a second subset of available convolutional filters at the convolutional layer of the CNN to third feature maps corresponding to the third input image, wherein the second subset has fewer convolutional filters than the first subset and each convolutional filter of the second subset is in the first subset.

23. The non-transitory machine readable medium of claim 22, wherein a number of convolutional filters in the first subset is not less than twice a number of convolutional filters in the second subset and a number of convolutional filters in the first subset and the one or more additional convolutional filters is not less than twice the number of convolutional filters in the first subset.

\* \* \* \* \*